G. FORNACA.
GEARING.
APPLICATION FILED OCT. 17, 1912.
1,138,098.
Patented May 4, 1915.
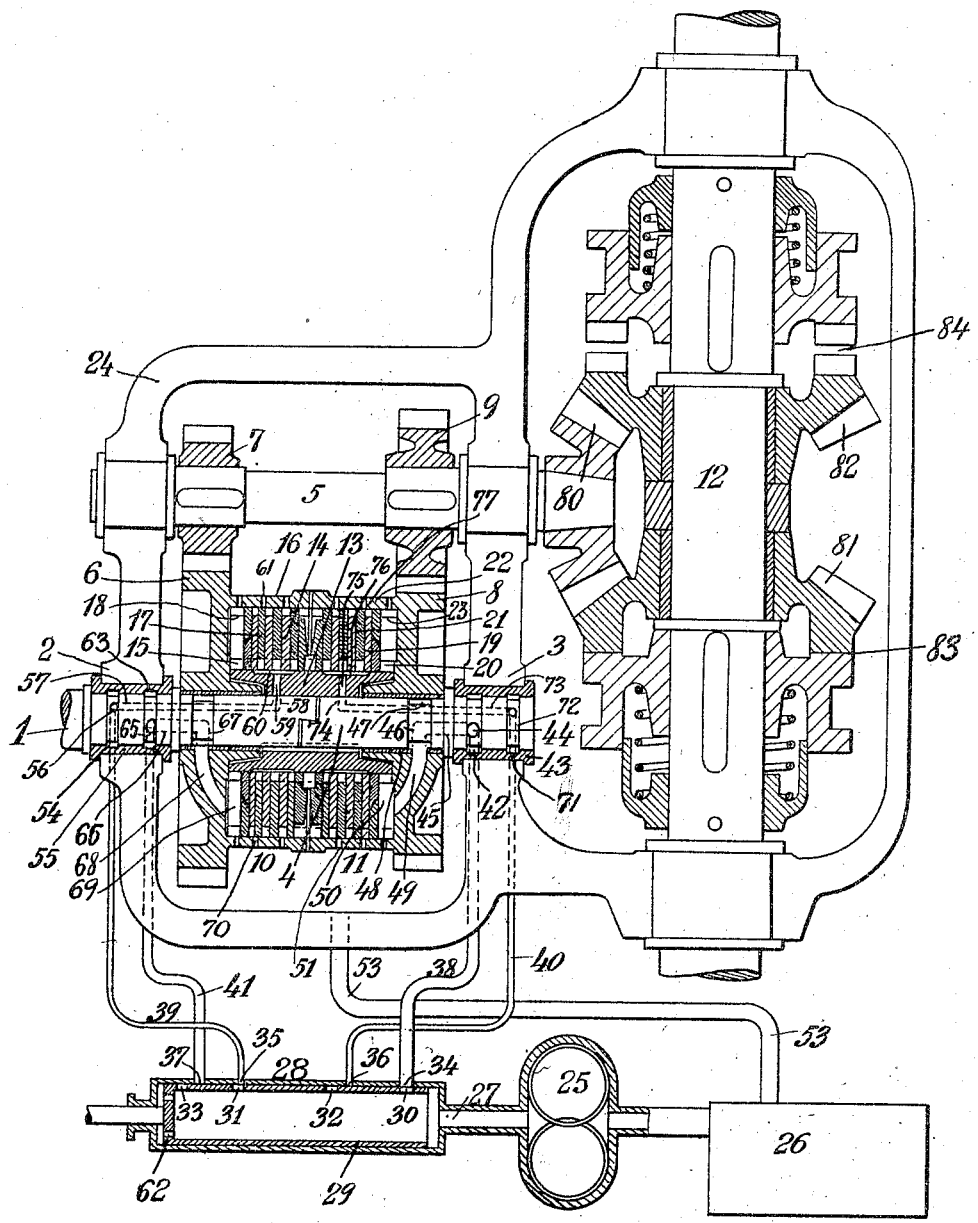
Witnesses:
Joseph Connolly Jr.
W. Friedland
Inventor
Guido Fornaca,
By his Attorneys
Edwards, Sager & Wooster

UNITED STATES PATENT OFFICE.

GUIDO FORNACA, OF TURIN, ITALY.

GEARING.

1,138,098.

Specification of Letters Patent.

Patented May 4, 1915.

Application filed October 17, 1912. Serial No. 726,233.

*To all whom it may concern:*

Be it known that I, GUIDO FORNACA, a subject of the King of Italy, residing at Turin, Italy, have invented certain new and useful Improvements in Gearing, of which the following is a full, clear, and exact specification.

This invention relates to gearing.

More particularly, my invention relates to a gearing for securing a desired number of forward and reverse speeds, with provision of fluid controlling means for securing at will any particular forward or reverse speed. Preferably, the connection between the driven shaft and the driving shaft for the several speeds obtainable is effected by means of a friction clutch comprising a plurality of sets of disks, or other elements, carried by the respective clutch members, and arranged to couple or uncouple at will the driven shaft with respect to the driving shaft by means of a fluid under pressure and controlled by suitable manipulating means.

Other features and objects of my invention will be more fully understood from the following description and the accompanying drawing, in which is shown partly in elevation, but largely in central cross-section, a mechanism embodying my invention.

The driving shaft 1 is shown journaled in the bearings 2, 3. Between the bearings 2, 3, the driving shaft 1 may comprise shaft sections 4, in order to facilitate assembling and disassembling. In the figure there is indicated an arrangement for obtaining two speed ratios between the driving shaft 1 and counter-shaft 5, and a clutch mechanism between the loose gears and their shaft, whereby two forward speeds and two reverse speeds will be imparted at will to the driven shaft. One speed ratio is secured by the gears 6, 7 and another speed ratio is secured by the gears 8, 9, the gears 7 and 9 being fixed on the counter-shaft 5, and in continuous mesh respectively with the gears 6 and 8. The gears 6, 8 are normally idle on the driving shaft 1, but are adapted to be clutched thereto by a fluid clutch comprising two similar clutch sections 10, 11. Fluid pressure means are provided for jointly controlling the clutch sections 10, 11, whereby either gear 6 or 8 is clutched at will to the driving shaft while unclutching the other. In the position shown, the gear 8 is coupled to the driving shaft 1 through the clutch section 11 thereby rotating the counter-shaft 5 at a predetermined speed ratio, and enabling the driven shaft 12 to be rotated either in a forward or reverse direction, as will be explained more fully hereinafter.

The clutch section 10 comprises a hub 13 fixed to the driving shaft 1 by means of a spline, or the like, and carrying disks 14 axially slidable thereon by means of the key 15. The cylindrical shell 16 is fixed to the solid gear 6, and carries disks 17 mounted on the key 18 to permit movement axially with respect to the driving shaft 1. The clutch section 11, similar to the clutch section 10, embodies disks 19 carried by the hub 13, and axially movable on the key 20; and further includes disks 21 carried by the cylindrical shell 22 fixed to the solid gear 8, the disks 21 being slidable longitudinally of the shaft 1 on the key 23. Preferably, the disks 14, 17 are circular in shape, and are assembled in alternate order; likewise, the disks 19 and 21 are preferably circular and arranged in alternate order. Both clutch sections 10, 11 are inclosed in the fluid-tight casing 24. The fluid for operating and controlling the clutch sections is pumped by pump 25 from the reservoir 26 into the pipe 27, and thence into the control valve 28, comprising the slidable valve member 29 having openings 30, 31 and 32, 33 adapted for certain positions to register respectively with openings 34, 35 and 36, 37 of the four pipes 38, 39, 40, 41, respectively. It will be noted that the pipes 38, 41, are respectively of larger cross-section than the pipes 39 and 40, whereby less resistance to the passage of the fluid will be offered by the first named pipes; this relation is advantageous, in that the pipes 38, 41 serve to transmit the fluid for forcing the disks of the respective clutch sections in contact to couple the desired gears with the driving shaft, whereas the smaller pipes 39, 40 serve to transmit the fluid for holding the disks of the uncoupled clutch section out of mutual engagement.

In the position shown in the drawing, wherein the clutch section 11 is coupled to the driving shaft 1, the valve opening 30 registers with the pipe opening 34, whereupon the fluid will flow through the large pipe 38 into the ring chamber 42 formed about the driving shaft 1 and bounded on the outside by the bearing sleeve 43, the fluid flowing thence into the transverse passage 44, longitudinal passage 45, transverse passage 46, which passages are disposed in the driving shaft 1, thence into the ring chamber 47 about the shaft 1 and inclosed by the sleeve 48 of the gear 8, thence into passage 49 in gear 8, and then into annular compartment 50, formed within the cylindrical shell 22 with the solid head of the gear 8 serving as the outer wall, whereby the fluid will force the disks 19, 21 toward the left against the fixed, extreme left-hand disk 19, and clutch the gear 8 to the hub 13. During this action, the fluid emerges from the compartment 50 through openings 51 in the cylindrical shell 22, flowing into the casing 24, and continuing its circulatory path through the return pipe 53 leading to the reservoir 26. By reason of the valve opening 31 registering with pipe opening 35 simultaneous with the registering of valve opening 30 with pipe opening 34, a relatively less amount of fluid will flow through pipe 39 into the ring chamber 54 about the shaft 1 and within the bearing ring 55, thence into transverse passage 56, longitudinal passage 57 and transverse passage 58,—which three passages are in shaft 1,—thence into passage 59 in hub 13, thence into ring chamber 60 on the periphery of the hub 13 and thereby flow past and between the disks 14, 17, forcing the same out of contact with one another, and thereby insuring the disconnection of the gear 6 from the driving shaft 1. The fluid continues its circulation by emerging through the openings 61 in the cylindrical shell 16, flowing into the casing 24 and returning through the pipe 53 to the reservoir 26, to be again pumped by the pump 25.

When it is desired to couple the driven shaft 12 with the driving shaft 1 for the higher speed through the gears 6, 7, the control valve 28 is moved by suitable operating levers, or other means, to a right-hand position to cause the valve opening 33 to register with pipe opening 37 of the larger pipe 41, and the valve opening 32 to register with the pipe opening 36 of the smaller pipe 40. It will be noted that the valve member 29 is provided with openings 62, in order to permit the valve member 29 to be freely moved without frictional interference with the fluid to all desired positions; these openings 62 also insure a balanced condition of the valve member 29 for all positions. The fluid flowing through the pipe 41 passes into the ring chamber 63 about the shaft 1 and within the bearing ring 55, thence into transverse passage 65, longitudinal passage 66, and transverse passage 67,—which three passages are in the shaft 1,—thence into passage 68 in the gear 6, and then into the annular chamber 69 formed between the solid head of gear 6 and the cylindrical shell 16, whereby the disks 14, 17 are forced toward the right in contact with one another and against the fixed, extreme left-hand disk 14, thereby coupling the gear 6 with the hub 13 fixed to the driving shaft 1. The fluid emerges from the annular chamber 69 through opening 70, flowing into casing 24, thence by return pipe 53 back into the reservoir 26. A lesser amount of fluid will also flow through the pipe 40 simultaneous to the flow through the pipe 41, the fluid flowing through pipe 40 entering the ring chamber 71 about the shaft 1 and within the bearing sleeve 43 of bearing 3, thence by transverse passage 72, longitudinal passage 73 and transverse passage 74,—which three passages are in the shaft 1,—and then through passage 75 in the hub 13 into the ring chamber 76 on the outer periphery of hub 13, thence past and between the disks 19, 21, forcing the same apart and maintaining the clutch section 11 in disconnected relation, the fluid emerging through opening 77 in the cylindrical shell 22, and returning through pipe 53 to the reservoir 26.

The rotation of the counter-shaft 5 at the desired speed ratio is transmitted through bevel gear 80, meshing with the oppositely disposed, idle bevel gears 81, 82, and thereby through either of the clutches 83, 84, imparting the desired speed ratio to the driven shaft 12. The clutch 83 is closed to give the desired speed in the forward direction, and the clutch 84 is closed to give the desired speed in the reverse direction. Clutches 83, 84 are controlled by any approved manipulating means, as will be understood. In the drawing, the clutch 83 is shown in and the clutch 84, of course, shown out. In the specific arrangement illustrated, the driven shaft may be rotated at will at two forward predetermined speeds and at two reverse predetermined speeds; however, the number of the forward or reverse speeds may be varied, the particular construction of which will be organized and operated in accordance with the preceding. It will be seen that when both clutches 83, 84 are thrown out, the driven shaft will be disconnected from the driving shaft.

In the operation of my invention, the pump will be driven by any suitable means, such as by gearing the same to the driving shaft, in such manner that the pressure of the fluid will be sufficient to force together the disks of the desired coupled clutch section, substantially without any slip between the disks. When the effective pressure applied to the disks is lessened sufficiently, it will be seen that a slip between the disks will take place, whereby the effective speed transmitted to the counter-shaft will be lessened. In order to obtain such regulation of effective speeds imparted to the driven shaft, I make the valve openings 31, 32 of larger diameter than the valve openings 30, 33, or form the valve openings 31, 32 in the shape of longitudinally extending slots. For example, taking the position of the valve member 28 shown in the drawing, the valve opening 30 registers exactly with the pipe opening 34; assuming the valve member 29 to be moved slightly to the right, the flow of the fluid through pipe 38 will be restricted, thereby reducing the pressure, whereas the flow of the fluid through pipe 39 will not be affected. A similar relationship exists between the valve openings 32 and 33, and permits a variation in the pressure of the fluid for securing a coupling of the desired clutch part, while at the same time insuring a disconnection of the uncoupled clutch section. It will also be seen that by my invention the speed may be readily controlled, so that there will be no danger of grinding or breaking the teeth of the clutches for connecting the driven shaft with the counter-shaft.

Whereas, I have illustrated my invention in one specific form, it will be understood that many changes and modifications may be made therein without departing from my invention.

Having thus described my invention, I declare that what I claim as new and desire to secure by Letters Patent, is:—

The combination with a driving shaft, a driven shaft and interposed gearing for varying the relative ratio and direction of movement of the driving and driven shafts, said gearing including fixed and loose gears for varying the driving ratio, a disk clutch for each of said loose gears, a fluid operated piston for closing the disks of said clutches, a restricted fluid vent from the piston chamber of each clutch, a separate fluid pressure passage discharging between the disks of each clutch to separate them, a restricted fluid vent from between said disks, a source of fluid pressure, and a valve for connecting said source of fluid pressure alternatively with any one of said clutch pistons while connecting the disks of the other clutches to the pressure to maintain them open, said valve permitting a continuous circulation of fluid from said source under variable pressure through said clutches.

In testimony whereof I affix my signature, in presence of two witnesses.

GUIDO FORNACA.

Witnesses:
JOCELYN GOUBEYRON.
TENO MENOTTO.